United States Patent [19]

Olah

[11] Patent Number: 4,508,618
[45] Date of Patent: Apr. 2, 1985

[54] INCREASING THE OCTANE NUMBER OF NATURAL GASOLINE WITH TRIFLUOROMETHANESULFONIC ACID

[75] Inventor: George A. Olah, Beverly Hills, Calif.

[73] Assignee: El Paso Products Company, Odessa, Tex.

[21] Appl. No.: 616,636

[22] Filed: Jun. 4, 1984

[51] Int. Cl.$^3$ .......................... C10G 35/06; C07C 2/54
[52] U.S. Cl. ..................................... 208/134; 585/708; 585/734; 585/747
[58] Field of Search ................ 208/134; 585/747, 708, 585/710, 734

[56] References Cited

U.S. PATENT DOCUMENTS 2,370,507  2/1945  Teichmann et al. ................ 585/747
4,035,286  7/1977  McCauley et al. ................ 208/134
4,044,069  8/1977  Bernard et al. .................... 585/747

FOREIGN PATENT DOCUMENTS 2300749  2/1975  France ............................... 585/747

OTHER PUBLICATIONS

Gramstad et al., "Alkyl Trifluoromethanesulphonates as Alkylating Agents, Trifluoromethanesulphonic Anhydride as a Promoter for Esterification and Some Reactions of Trifluoromethanesulphonic Acid", J. Chem. Soc., 1957, 4069–4079, (London).
Bakoss et al., "Studies in Trifluoromethanesulfonic Acid-Kinetics and Mechanism of Transalkylation Reactions", J. Org. Chem., vol. 47, pp. 4053–4055, (1982).
Choukroun et al., "Perfluorosulfonic Acids. Isomerization of n-Butane by Radical Activation in Super Acidic Medium", Chem. Abstract 95: 61092q, (1981).

Primary Examiner—Delbert E. Gantz
Assistant Examiner—Lance Johnson
Attorney, Agent, or Firm—Fred S. Valles; Margareta LeMaire

[57] ABSTRACT

Natural gasoline of low octane value derived from natural gas is upgraded to higher octane value by means of catalyst consisting essentially of trifluoromethanesulfonic acid at temperatures between about 80° C. and about 120° C., and preferably between about 100° C. and about 120° C.

5 Claims, No Drawings

INCREASING THE OCTANE NUMBER OF NATURAL GASOLINE WITH TRIFLUOROMETHANESULFONIC ACID

This application is related to copending applications, Ser. No. 458,825 filed Jan. 18, 1983 now U.S. Pat. No. 4,472,268, and Ser. No. 561,223 filed Dec. 14, 1983, which disclose the upgrading of natural gasoline with related catalyst compositions.

BACKGROUND OF THE INVENTION

1. Field of the Invention

This invention relates to a process for upgrading hydrocarbons of relatively low boiling point and relatively poor antiknock properties into hydrocarbons having higher antiknock ratings and suitable for use as motor fuel blending stocks. More particularly, the invention relates to the use of a catalyst consisting essentially of trifluoromethanesulfonic acid for the conversion of natural gasoline derived from natural gas into a gasoline product of higher octane number than the original charge stock.

2. Description of the Prior Art

Saturated highly branched-chain paraffin hydrocarbons, and particularly mixtures thereof, occurring in gasoline fractions are very desirable motor fuel components because of their antiknock properties. It is known, for example, that the more highly branched chain isomers of paraffins are more valuable than the corresponding unbranched or less branched paraffins because of their higher octane rating. The 2,2-dimethylbutane isomer of hexane, for example, has an octane number of 92 whereas normal hexane has an octane rating of 25. Similarly, 2,2,3-trimethylbutane (triptane) also has a highly branched chain structure and provides fuel characteristics far exceeding the isoheptanes such as methylhexanes and dimethylpentanes. Because of its highly branched structure, the octane rating of triptane exceeds that of isooctane which has a rating of 100. The demand for motor fuels of high octane value without lead additives has increased steadily and a variety of hydrocarbon processes have been suggested whereby various dydrocarbon oils, such as straight run gasolines, naphthas and similar hydrocarbon mixtures, have been upgraded to produce gasoline of higher octane value.

U.S. Pat. No. 3,594,445 discloses the isomerization of normal and naphthenic paraffins by employing a catalyst containing (1) a fluoride of a metal of Group V such as antimony pentafluoride and (2) a fluorosulfonic acid in the presence of hydrogen and an olefin and/or an alkyl fluorosulfonate.

U.S. Pat. No. 3,766,286 discloses the isomerization of paraffinic and/or alkyl substituted aromatic hydrocarbons with a catalyst comprising (a) a Lewis acid of the formula $MX_n$ where M is selected from Group IV-B, V or VI-B of the Periodic Table, X is a halogen and n varies from 3 to 6, and (b) a strong Bronsted acid comprising fluorosulfuric acid, trifluoromethanesulfonic acid, trifluoracetic acid or mixtures thereof.

U.S. Pat. No. 3,778,489 discloses the alkylation of a paraffin with separate olefin streams using a strong acid such as sulfuric acid, hydrogen fluoride, halosulfuric acid, trihalomethanesulfonic acid and the like.

U.S. Pat. No. 3,839,489 discloses the isomerization of paraffinic feedstocks using a catalyst consisting of arsenic pentafluoride, antimony pentafluoride, and mixtures thereof with either trifluoromethanesulfonic acid or hydrogen in the presence of hydrogen.

U.S. Pat. No. 3,996,116 discloses the conversion of straight-chain saturated hydrocarbons into branched-chain saturated hydrocarbons by ocidizing the hydrocarbons in liquid phase in the presence of a superacid such as $HFSO_3$ by electrolysis at a voltage between the half wave voltage of the hydrocarbon and that of the superacid.

U.S. Pat. No. 3,852,184 relates to the isomerization of alkylcyclopentane in a reforming feed to cyclohexanes in the presence of hydrogen employing a catalyst mixture of a metal halide and a protonic acid, preferrably hydrogen halide. As other alternate, protonic acids fluorosulfonic acid, monofluorophosphoric acid, difluorophosphoric acid, trifluoromethanesulfonic acid, trifluoroacetic acid and bis(perfluoromethylsulfonyl)methane are suggested.

U.S. Pat. No. 4,035,286 discloses the octane upgrading of light naphtha streams using as catalyst a mixture of antimony pentafluoride and a fluoroalkanesulfonic acid.

U.S. Pat. No. 4,044,069 discloses a process for the isomerization and alkylation of paraffinic hydrocarbons by means of a catalyst composition comprising a mixture of Lewis acids such as arsenic pentafluoride and a sulphonic acid corresponding to the general formula $RF(SO_3H)p$ where RF represents an alkylperfluorinated or cycloalkylperfluorinated hydrocarbon radical having a number of carbon atoms between 2 and 8 and p is 1 or 2.

Other pertinent literature art includes the articles "Mechanism of Acid-Catalyzed Isomerization of the Hexanes" by D. A. McCaulay (Std. Oil Co. 1959) *J. Am. Chem. Soc.*, Vol. 81, p. 6437, "Trifluoromethanesulfonic Acid and Derivatives" by R. D. Howells and J. D. McCown, *Chemical Reviews*, Vol. 77, No. 1, p. 69, and "Superacids", by George A. Olah et al., *Science*, Vol. 206, p. 13.

SUMMARY OF THE INVENTION

The present invention is related to the upgrading of natural gasoline by treatment with a catalyst consisting essentially of trifluoromethanesulfonic acid in the absence of added olefins. More specifically, natural gasoline of low octane value derived from natural gas is upgraded to a higher octane value by treatment with the catalyst at temperatures between about 80° C. and about 120° C. for short contact times. By means of the invention, a simple and practical upgrading treatment is provided whereby lead-free gasoline can be obtained directly from hydrocarbon materials having relatively poor antiknock properties without the necessity of increasing the octane value by adding lead or manganese additives or by addition of higher-octane aromatics or olefins, all which may pose environmental or health hazard problems. Furthermore, the process of the invention may be applied to charge stocks which contain aromatic hydrocarbons and thus may be carried out in a single stage operation without a costly preliminary separation step such as dearomatization.

DETAILED DESCRIPTION OF THE INVENTION

The starting material employed in the process of the invention is natural gasoline derived from natural gas, a naturally occurring mixture of hydrocarbon and nonhydrocarbon gases found in geological formations often in association with petroleum. Separation of components higher in molecular weight than methane by processes such as compression, cooling or absorption yields what is referred to as natural gas liquids. Removal of ethane, propane and most of the butanes yields natural gasolines, a complex hydrocarbon mixture predominantly paraffinic in character, mainly pentanes, hexanes and heptanes, with a carbon number of 4 to 10. The natural gasoline employed in the process generally contains less than 15 weight percent cyclic paraffins, 5 weight percent aromatics and no detectable amount of olefins. The gasoline has a boiling range at atmospheric pressure of about 26.6° C. to 114.4° C. (80° F. to 238° F.). A typical analysis of a natural gasoline from the Odessa, Tex., region has a research octane number of about 65-70 and a composition as shown in Table I.

The catalyst used in this invention is trifluoromethanesulfonic acid, which is added to provide a catalyst to hydrocarbon volumetric ratio in the range from about 0.1:1 to about 2:1. The upgrading reaction is carried out by contacting the natural gasoline feed with the catalyst at temperatures between about 80° C. and about 120° C., preferably 100° to 120° C., for a period of time ranging from about 10 minutes to 4 hours and preferably from about 15 minutes to about 2 hours employing very modest pressures in the range of about 50 to about 100 psig to maintain the hydrocarbon feed substantially in liquid phase.

Under the conditions of the present invention other superacids such as fluorosulfonic acid ($FSO_3H$) or magic acid (i.e. $FSO_3H$-$SbF_5$) are not effective as catalysts for gasoline upgrading. First of all $FSO_3H$ shows high reactivity with aromatic compounds present in the natural gasoline (sulfonation etc.) and the feed thus needs to be dearomatized prior to treatment. Further fluorosulfonic acid by itself is not effective for upgrading even dearomatized gasoline and addition of a co-acid such as hydrofluoric acid and ~200 psi of $BF_3$ is required for the upgrading process. At higher temperature (>45° C.) extensive cracking is observed rendering $FSO_3H$ useless for natural gasoline upgrading. This is also the case with magic acid.

The invention is unexpected and could not have been predicted by prior art teachings. Whereas raising the temperature generally accelerates reactions, upgrading of natural gasoline is a complex process, where no simple predictions can be made and where experimental results are not readily correlatable. Equilibria of isomerization of alkanes in the gasoline range are temperature dependent and with increasing temperature branching, essential for good octane number decreases. Thus, anticipated effect of raising the temperature to 80°-120° C. would be a decrease in octane number. At the same time acceleration of competing cleavage-cracking reactions, as demonstrated with other superacids, also render higher temperature treatment generally unfeasible. It has now been discovered that in the specific temperature range of 80°-120° C. and especially in the range of 100°-120° C., with trifluoromethanesulfonic acid an advantageous balance of isomerization, alkylation, transalkylation and the like reactions is capable to effect low pressure upgrading to high octane gasoline.

The process of the invention can be carried out either in a continuous or batchwise manner, or combinations of continuous and batchwise treatment may be employed. In the conversion zone, any suitable reactor apparatus which provides thorough contact between the catalyst and the various components of the natural gasoline feed material, including recycled material, may be used. Since it is particularly important to achieve thorough contact between the catalyst and hydrocarbon mixture, it is contemplated that batch or continuous reactors of the agitator type, the circulator-mixer type, the tower type, or tube reactors with suitable baffles will be used whereby the catalyst is quickly and intimately dispersed throughout the hydrocarbon misture.

Upon settling in a suitable settling zone, the upgraded gasoline is easily separated from the acid catalyst which can be directly recycled back to the reaction zone.

At least a portion of this catalyst will need to be regenerated from time to time to prevent build up of dissolved aromatics and other higher hydrocarbons. This can be effected by a simple distillation optionally combined with a sulfuric acid treatment to remove accumulated moisture and impurities.

There are many advantages of the process of the present invention. For instance, because of the mild operating conditions, especially pressure, the material cost of the reactor equipment as well as the utility cost are minimized. Furthermore, the single component catalyst makes the process extremely simple to operate in that there is no need for monitoring catalyst component ratios within desired values, and regeneration is easily accomplished, etc. Also, the trifluoromethanesulfonic acid catalyst of this invention, in sharp contrast to other superacids, is compatible with the natural gasoline feed and causes no undesired side reactions (sulfonation, cleavage, etc.).

The following examples illustrate the best mode now contemplated for carrying out the invention without, however, limiting its scope.

EXAMPLES 1 THROUGH 5

In each of the examples an agitated stainless steel autoclave provided with external heating and cooling means was charged with 100 ml natural gasoline and 100 ml trifluoromethanesulfonic acid. Heat was applied while agitating the reaction mixture. The reaction was timed from the point the desired temperature level had been reached. At the end of the reaction period the autoclave contents were cooled and separated and the product was analyzed by gas chromatography. The pertinent feed and product analyses as well as operating conditions used in the examples are shown in Table 1.

As indicated by the results in the Table, natural gasoline treated with trifluoromethanesulfonic acid at 25° C. for 4 hours (Example 1) did not in any appreciable way increase the octane number and the starting material was recovered almost unchanged. Increasing the temperature to 50° C. as in Example 2 did not significantly alter the results. At 80° C. and with short reaction time a significant increase in octane numbers was observed (Example 3) and the product had a research octane number of 78. Even further improvements were obtained in Examples 4 and 5 at temperatures of 100° and 120° C. where products were collected having octane numbers of about 83 and about 86 respectively.

However, additional experiments conducted under similar conditions but at temperatures beyond 120° C. resulted in undesired increased cracking to $C_4$ and lower hydrocarbons.

It is obvious to those skilled in the art that many variations and modifications can be made to the process of this invention. All such departures from the foregoing specification are considered within the scope of this invention as defined by this specification and appended claims.

ter recovering an upgraded natural gasoline product of higher octane value.

TABLE 1

| | Natural Gasoline Upgrading with $CF_3SO_3H$ | | | | | |
|---|---|---|---|---|---|---|
| Exp. No. | Natural Gasoline Feed | 1 | 2 | 3 | 4 | 5 |
| Gasoline (ml.) | | 100 | 100 | 100 | 100 | 100 |
| $CF_3SO_3H$ (ml.) | | 100 | 100 | 100 | 100 | 100 |
| Temperature (C.) | | 25 | 50 | 80 | 100 | 120 |
| Reaction Time (hrs.) | | 4 | ½ | ½ | ½ | ½ |
| Results | | | | | | |
| iso-Butane (wt. %) | — | — | 0.2 | 1.4 | 3.8 | 3.9 |
| n-Butane (wt. %) | 1.3 | 1.9 | 0.5 | 1.2 | 1.3 | 0.6 |
| 2,2-Dimethylpropane (wt. %) | — | — | — | — | — | — |
| iso-Pentane (wt. %) | 21.5 | 21.2 | 23.1 | 22.7 | 27.1 | 35.9 |
| n-Pentane (wt. %) | 20.5 | 19.5 | 20.9 | 18.0 | 15.6 | 17.5 |
| 2,2-Dimethylbutane (wt. %) | 0.2 | 0.2 | 0.3 | 0.8 | 2.0 | 2.8 |
| 2-Methylpentane (wt. %) | 10.1 | 9.6 | 13.0 | 12.4 | 13.2 | 12.7 |
| 3-Methylpentane (wt. %) | 5.1 | 4.8 | 4.8 | 4.3 | 4.8 | 4.6 |
| n-Hexane (wt. %) | 8.1 | 7.7 | 8.3 | 7.0 | 4.9 | 3.8 |
| 2,2-Dimethylpentane (wt. %) | — | — | — | 0.1 | 0.2 | 0.2 |
| Methylcyclopentane (wt. %) | 5.1 | 4.9 | 4.0 | 3.6 | 3.5 | 2.4 |
| 2,2,3-Trimethylbutane (wt. %) | — | — | — | — | — | — |
| 2-Methylhexane (wt. %) | 1.3 | 1.5 | 1.5 | 5.6 | 4.1 | 2.9 |
| 2,3-Dimethylpentane (wt. %) | 0.7 | 0.5 | — | — | — | — |
| 3-Methylhexane (wt. %) | 1.8 | 1.7 | — | — | — | — |
| 2,2,4-Trimethylpentane (wt. %) | 1.7 | 1.5 | — | — | — | — |
| n-Heptane (wt. %) | 2.9 | 3.0 | 2.3 | 2.3 | 1.0 | 0.4 |
| 2,2-Dimethylhexane (wt. %) | 3.4 | 3.5 | 5.8 | 6.9 | 6.7 | 5.3 |
| 2,5-Dimethylhexane (wt. %) | 0.4 | 0.4 | — | — | — | — |
| 3,3-Dimethylhexane (wt. %) | 0.4 | 0.4 | — | — | — | — |
| 2,3,4-Trimethylpentane (wt. %) | 0.4 | — | — | — | — | — |
| 2-Methylheptane (wt. %) | 0.5 | 0.9 | — | — | — | — |
| 3-Methylheptane (wt. %) | 1.0 | 0.7 | 0.6 | 2.2 | 2.0 | 0.5 |
| Balance $C_6$ (wt. %) | — | — | — | — | — | — |
| Balance $C_7$ (wt. %) | 7.9 | 8.0 | 10.1 | 6.8 | 6.1 | 4.1 |
| Balance $C_8^+$ (wt. %) | 5.8 | 8.1 | 4.3 | 4.8 | 3.6 | 2.1 |
| Total $C_4$ (%) | 1.3 | 1.9 | 0.7 | 2.6 | 5.1 | 4.5 |
| Total $C_5$ (%) | 42.0 | 40.7 | 44.0 | 40.7 | 42.7 | 53.4 |
| Total $C_6$ (%) | 28.6 | 27.2 | 30.4 | 28.1 | 28.4 | 26.3 |
| Total $C_7$ (%) | 14.6 | 14.7 | 13.9 | 14.8 | 11.4 | 7.6 |
| Total $C_8$ (%) | 11.9 | 15.5 | 10.7 | 13.9 | 12.3 | 7.9 |
| i-$C_5$/N-$C_5$ | 1.05 | 1.0 | 1.10 | 1.26 | 1.74 | 2.05 |
| Calculated RON | 70.2 | 70.0 | 71.0 | 78.0 | 83.3 | 85.5 |

What is claimed is:

1. A process for upgrading an aromatics-containing natural gasoline of low octane value derived from natural gas which comprises contacting said gasoline containing about 5 wt. % or less aromatics in the absence of added olefin under reaction conditions comprising a temperature in the range between about 100° C. and about 120° C. and a contact time between about 10 minutes and about 4 hours with a catalyst consisting essentially of trifluoromethanesulfonic acid and thereafter recovering an upgraded natural gasoline product of higher octane value.

2. The process of claim 1 wherein the contact time is between about 15 minutes and about 2 hours.

3. The process of claim 1 wherein the contacting is carried out under a pressure at least sufficient to maintain the gasoline substantially in liquid phase.

4. The process of claim 3 wherein said pressure is in the range from about 50 psig to about 100 psig.

5. The process of claim 1 wherein the catalyst to hydrocarbon volumetric ratio is between about 0.1:1 and about 2:1.

* * * * *